(12) United States Patent
Ballantine

(10) Patent No.: US 12,021,386 B2
(45) Date of Patent: Jun. 25, 2024

(54) INTEGRATED SOLAR TO LONG TERM ENERGY STORAGE SYSTEM WITH WEATHER SENSING

(71) Applicant: Ohmium International, Inc., Incline Village, NV (US)

(72) Inventor: Arne Ballantine, Incline Village, NV (US)

(73) Assignee: Ohmium International, Inc., Newark, CA (US)

( * ) Notice: Subject to any disclaimer, the term of this patent is extended or adjusted under 35 U.S.C. 154(b) by 0 days.

(21) Appl. No.: 18/076,337

(22) Filed: Dec. 6, 2022

(65) Prior Publication Data

US 2023/0178991 A1 Jun. 8, 2023

Related U.S. Application Data

(60) Provisional application No. 63/286,847, filed on Dec. 7, 2021.

(51) Int. Cl.
| | | |
|---|---|---|
| *H02J 3/38* | (2006.01) | |
| *H02J 3/00* | (2006.01) | |
| *H02J 3/28* | (2006.01) | |
| *H02S 10/20* | (2014.01) | |

(52) U.S. Cl.
CPC .............. *H02J 3/28* (2013.01); *H02S 10/20* (2014.12); *H02J 2300/26* (2020.01)

(58) Field of Classification Search
CPC .......... H02S 40/38; H02S 40/36; H02S 40/34; H02S 40/30; H02S 10/20; H02J 3/28; H02J 2300/26; H02J 2300/24; H02J 2300/22; H02J 2300/20; H02J 2300/00
See application file for complete search history.

(56) References Cited

U.S. PATENT DOCUMENTS

| | | | |
|---|---|---|---|
| 8,669,499 B2 | 3/2014 | Conrad | |
| 9,257,847 B2* | 2/2016 | Johnson | H02J 3/381 |
| 9,960,729 B2* | 5/2018 | Futakuchi | F24S 50/20 |
| 10,411,641 B2* | 9/2019 | Mishra | H02S 10/20 |
| 10,978,876 B2* | 4/2021 | Webb | H02J 3/381 |
| 2009/0025775 A1* | 1/2009 | Parra Cebrian | F24S 25/13 |
| | | | 136/230 |
| 2010/0006087 A1* | 1/2010 | Gilon | F24S 50/20 |
| | | | 126/572 |
| 2010/0175741 A1* | 7/2010 | Thorne | H02S 20/32 |
| | | | 136/251 |

(Continued)

*Primary Examiner* — John R Lee
(74) *Attorney, Agent, or Firm* — Polsinelli LLP

(57) ABSTRACT

The present disclosure generally relates to systems and techniques for power generation. For example, aspects of the present disclosure include systems and techniques for managing renewable energy power based on weather sensing. One example method generally includes: receiving information related to cloud coverage impacting intensity of light towards one or more panels of a photovoltaic (PV) generator, the PV generator being configured to provide power to a load; selecting one of a plurality of power storage equipment based on the information related to the cloud coverage, the plurality of power storage equipment being associated with different types of power storage; and controlling distribution of power from the one of the plurality of power storage equipment to the load.

18 Claims, 9 Drawing Sheets

(56) References Cited

U.S. PATENT DOCUMENTS

| | | | | |
|---|---|---|---|---|
| 2011/0084551 A1* | 4/2011 | Johnson | ............ | H02J 3/381 |
| | | | | 136/244 |
| 2011/0120447 A1* | 5/2011 | Sobolewski | ......... | F24S 30/425 |
| | | | | 126/714 |
| 2011/0224831 A1* | 9/2011 | Beardsworth | ......... | H02S 50/00 |
| | | | | 136/246 |
| 2013/0061908 A1* | 3/2013 | Wagoner | ............ | H02S 20/32 |
| | | | | 136/246 |
| 2014/0150846 A1* | 6/2014 | Beardsworth | ......... | H02S 40/00 |
| | | | | 136/246 |
| 2014/0175260 A1* | 6/2014 | Futakuchi | ............ | F24S 50/20 |
| | | | | 136/246 |
| 2015/0188482 A1* | 7/2015 | Berkowitz | ............ | H02S 40/38 |
| | | | | 320/101 |
| 2016/0320787 A1* | 11/2016 | Carlson | ............ | G05F 1/67 |
| 2018/0054156 A1* | 2/2018 | Lokey | ............ | G05D 3/105 |
| 2018/0102728 A1* | 4/2018 | Mishra | ............ | H02S 10/20 |
| 2020/0006942 A1* | 1/2020 | Lansing, Jr. | ............ | H02J 3/28 |
| 2020/0036325 A1* | 1/2020 | Poivet | ............ | H02S 30/20 |
| 2020/0076197 A1* | 3/2020 | Chen | ............ | H02J 13/00034 |
| 2020/0116126 A1* | 4/2020 | Jamuna | ............ | F03D 7/0224 |
| 2021/0027399 A1* | 1/2021 | Mizutani | ............ | H01M 10/425 |
| 2021/0301787 A1* | 9/2021 | Brombach | ............ | F03D 9/257 |
| 2022/0311379 A1* | 9/2022 | Hansen | ............ | H02J 3/381 |
| 2022/0337186 A1* | 10/2022 | Sun | ............ | H02S 20/32 |
| 2023/0039146 A1* | 2/2023 | Kroyzer | ............ | G05B 19/042 |
| 2023/0178991 A1* | 6/2023 | Ballantine | ............ | H02J 3/28 |
| | | | | 307/65 |
| 2023/0178993 A1* | 6/2023 | Ballantine | ............ | H02J 3/28 |
| | | | | 700/291 |

\* cited by examiner

INTEGRATED SOLAR TO LONG TERM ENERGY STORAGE SYSTEM WITH WEATHER SENSING

CROSS-REFERENCE TO RELATED APPLICATION

The present application claims priority to U.S. provisional application No. 63/286,847, filed on Dec. 7, 2021, which is incorporated by reference herein in its entirety.

FIELD

The present disclosure generally relates to systems and techniques for power generation. For example, aspects of the present disclosure include systems and techniques for managing renewable energy power based on weather sensing.

BACKGROUND

Renewable energy sources are becoming important for sourcing of power in various applications. Some renewable energy sources are dependent on weather conditions, such as the presence of wind or sunlight. At the same time, there has been a rapid growth in the hydrogen industry. For example, hydrogen generation systems, particularly electrolyzers, are becoming increasingly more common. As capacity for hydrogen generation increases at a single site and multiple generators are connected in parallel, controlling hydrogen production to meet demand at a site becomes more complex, particularly when the hydrogen is consumed intermittently or when production relies on time-varying input resources.

SUMMARY

Certain aspects of the present disclosure are directed towards a method for power generation. The method generally includes: receiving information related to cloud coverage impacting intensity of light towards one or more panels of a photovoltaic (PV) generator, the PV generator being configured to provide power to a load; selecting one of a plurality of power storage equipment based on the information related to the cloud coverage, the plurality of power storage equipment being associated with different types of power storage; and controlling distribution of power from the one of the plurality of power storage equipment to the load.

Certain aspects of the present disclosure are directed towards a method for power generation. The method generally includes: receiving information related to cloud coverage impacting intensity of light towards one or more panels of a photovoltaic (PV) generator, the PV generator being configured to provide power to a load; determining an orientation of one or more panels of the PV generator based on the information related to cloud coverage; and outputting control signaling to control the orientation of the one or more panels based on the determination.

Certain aspects of the present disclosure are directed towards a method for power generation. The method generally includes: processing an output voltage from one or more panels of a photovoltaic (PV) generator to identify information associated with wind speed impacting the one or more panels; determining an orientation of one or more panels of the PV generator based on the information associated with the wind speed; and outputting control signaling to control the orientation of the one or more panels based on the determination.

BRIEF DESCRIPTION OF THE DRAWINGS

Illustrative embodiments of the present application are described in detail below with reference to the following drawing figures.

DETAILED DESCRIPTION

Renewable energy such as photovoltaic installations are subject to output power fluctuations when weather conditions change. Solar panel tracker performance is typically not based on real-time weather data. The algorithms may not be dynamic to take into account changes in weather. In some cases, when a large storm is anticipated, panel trackers may be positioned to the horizontal position to reduce wind stresses on the panels. Moreover, when clouds block a direct path of sunlight, horizontal positioning of panels collect more solar energy than maintaining an alignment of panels towards the sun. Certain aspects of the present disclosure are directed toward systems and techniques for managing power delivery to a load. The power generation system controls power distribution based on weather data, improving power efficiency and consistency of the renewable energy output.

Figure 1:
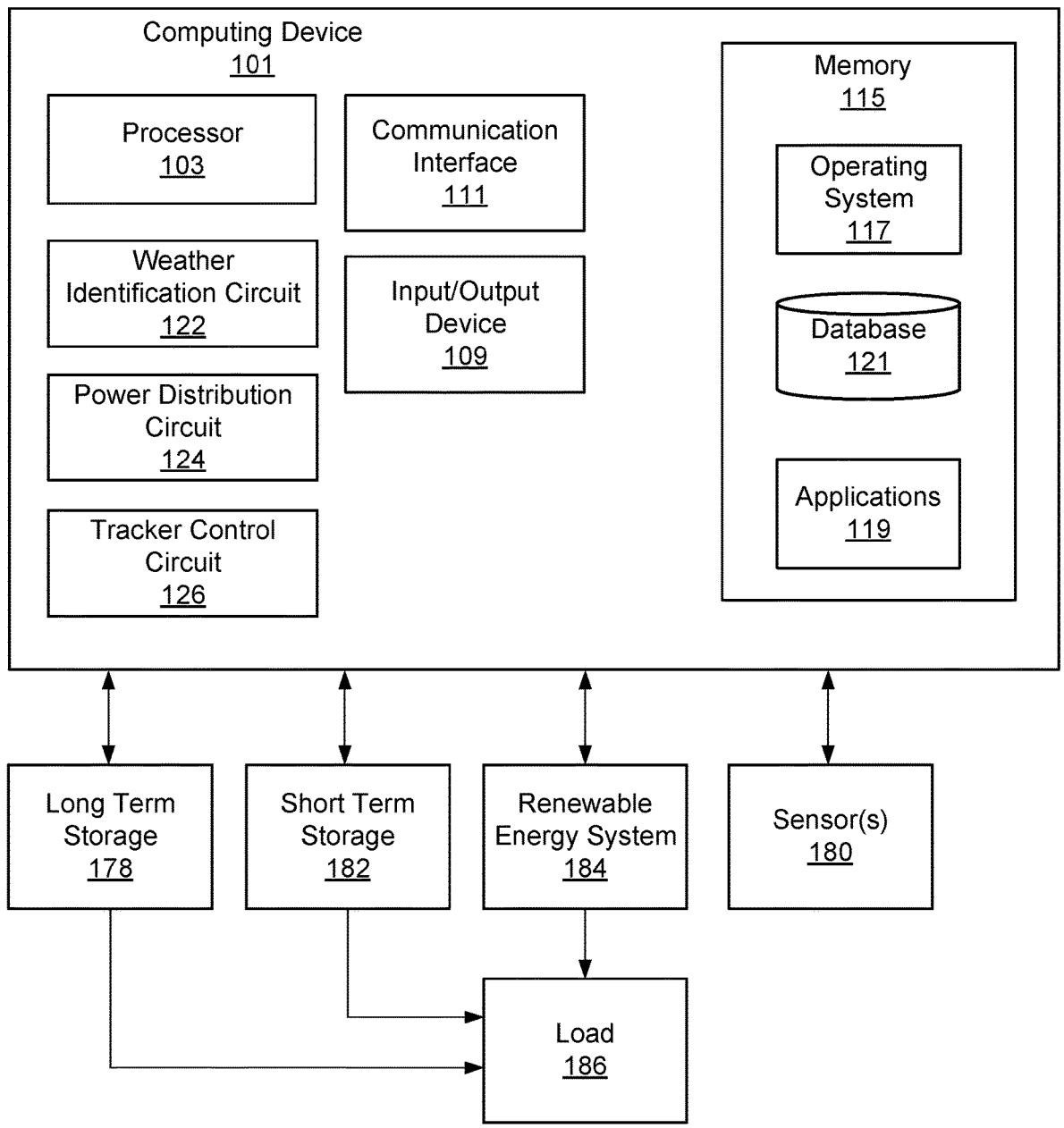
FIG. 1 illustrates a power generation system, in accordance with certain aspects of the present disclosure.

FIG. 1 illustrates a power generation system 100, in accordance with certain aspects of the present disclosure. In some aspects, the power generation system 100 may include a computing device 101, as shown. The computing device 101 can include a processor 103 for controlling the overall operation of the computing device 101 and its associated components, including input/output device 109, communication interface 111, and/or memory 115. A data bus can interconnect processor(s) 103, memory 115, I/O device 109, and/or communication interface 111.

Input/output (I/O) device 109 can include a microphone, keypad, touch screen, and/or stylus through which a user of the computing device 101 can provide input and can also include one or more of a speaker for providing audio output and a video display device for providing textual, audiovisual, and/or graphical output. Software can be stored within memory 115 to provide instructions to processor 103 allowing computing device 101 to perform various actions. For example, memory 115 can store software used by the computing device 101, such as an operating system 117, application programs 119, and/or an associated internal database 121. The various hardware memory units in memory 115 can include volatile and nonvolatile, removable, and non-removable media implemented in any method or technology for storage of information such as computer-readable instructions, data structures, program modules or other data. Memory 115 can include one or more physical persistent memory devices and/or one or more non-persistent memory devices. Memory 115 can include, but is not limited to, random access memory (RAM), read only memory (ROM), electronically erasable programmable read only memory (EEPROM), flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by processor 103.

Communication interface 111 can include one or more transceivers, digital signal processors, and/or additional circuitry and software for communicating via any network, wired or wireless, using any protocol as described herein. Processor 103 can include a single central processing unit (CPU), which can be a single-core or multi-core processor (e.g., dual-core, quad-core, etc.), or can include multiple CPUs. Processor(s) 103 and associated components can allow the computing device 101 to execute a series of computer-readable instructions to perform some or all of the processes described herein. Although not shown in FIG. 1, various elements within memory 115 or other components in computing device 101, can include one or more caches, for example, CPU caches used by the processor 103, page caches used by the operating system 117, disk caches of a hard drive, and/or database caches used to cache content from database 121. For implementations including a CPU cache, the CPU cache can be used by one or more processors 103 to reduce memory latency and access time. A processor 103 can retrieve data from or write data to the CPU cache rather than reading/writing to memory 115, improving the speed of these operations. In some examples, a database cache can be created in which certain data from a database 121 is cached in a separate smaller database in a memory separate from the database, such as in RAM or on a separate computing device.

In certain aspects of the present disclosure, the computing device 101 may include a weather identification circuit 122. The weather identification circuit 122 may be used to determine a current weather status or forecast a future weather status. For instance, the weather identification circuit 122 may receive data from one or more weather sensors 180, or determine/forecast weather using meteorologist data that may be received via the communication interface 111. The computing device 101 may also include a power distribution circuit 124 that may control power distribution based on the weather data derived by the weather identification circuit 122.

In some aspects, the weather identification circuit 122 and power distribution circuit 124 may be implemented in software or hardware, or a combination of software and hardware. Weather identification circuit 122 and power distribution circuit 124 may be implemented as part of processor 103, in some aspects.

The power generation system 100 may be an integrated system having a photovoltaic solar power array 184 (also referred to as a "photovoltaic (PV) generator"), weather sensing elements (e.g., sensors 180), short term energy storage 182 and long term energy storage 178. As used herein, short term energy storage and long term energy storage refer to how long a particular type of energy takes to generate and store. Long term energy storage refers to any storage type of energy that takes longer to generate and store than short term energy storage. For example, battery charging can occur in a relatively short time and may be referred to as short term energy storage. In contrast, hydrogen generation and storage takes a relatively long time and may be referred to as long term energy storage. As shown, power from the short term energy storage, long term energy storage, and the solar power array 184 may be provided to a load 186. In this manner, the short or long term energy storage may be used to supplement the power generated by the solar power array 184 for the load 186. The sensors 180 may be operable to detect one or more of wind speed, wind direction, humidity, temperature, atmospheric pressure, etc.

In some aspects of the present disclosure, when weather identification circuit 122 identifies a small, fast moving cloud passing over a solar installation (e.g., including the solar power array 184), reducing solar output, power distribution circuit 124 may use power from (e.g., discharge) the short term storage to supplement the photovoltaic solar power output of the solar installation to load 186, facilitating steady sourcing of power to the load. Once the cloud has fully passed, the short term energy storage (e.g., batteries) may be recharged.

In some aspects, the power generation system may be operated such that when cloud transients are more severe either in length of time or in degree of coverage, long term energy storage is used and discharged to supplement the photovoltaic solar output. When the cloud transient is completed (e.g., passed over the solar installation), the long term storage is recharged (e.g., refilled). The present system integrates control functions with weather forecast or weather measurement inputs such that the start-up, operation and shutdown transients (e.g., of long term storage technology) are improved for operation.

When weather forecasting indicates low solar production in future days or hours, storage may be optimized for the long term at a higher rate of charge (e.g., albeit at lower efficiency due to increasing the rate of charge). For example, maximum energy may be delivered to the long term storage 178 to maximize long term reserves in anticipation of low solar production.

When weather forecasting indicates high solar production, and when long term storage has been substantially filled or when weather conditions indicate that long term storage will not be required, the long term storage equipment may be controlled into a shut down state or low-energy draw idle condition and short term storage may be used to a large extent or exclusively.

In some aspects of the present disclosure, short term energy storage (e.g., short term storage 182) may include batteries. For instance, the power generation system 100 may be configured as a hybridization solar with batteries such as lithium ion batteries to create a stabilized output when a high-density, high-contrast cloud passes over the solar installation. In some aspects, long term storage 178 may include water electrolysis hydrogen generation. In some aspects, the long term storage 178 may include hydrogen fuel cell generation and storage. The long term energy storage may be used to provide power to a load when weather is known to occlude sunlight for long periods, preventing or reducing the generation of power by the solar installation. The storage configurations described herein may also include super-capacitors or other types of electron storage elements for short term storage. While some short- and long-term storage examples are provided to facilitate understanding, the storage configurations described herein may use any suitable storage. For example, long term energy storage may include thermal storage and/or pumped hydro storage.

The efficiency of long term hydrogen storage may be increased in that the hydrogen generation may be performed at low power and low hydrogen rate setting where electrochemical cells have low ohmic losses. Long term fuel cell power generation from hydrogen may be improved for efficiency in that the hydrogen generation may be performed at low power with low hydrogen consumption and low electrochemical cell ohmic losses. This mode of operation may be used when weather outlook favors high photovoltaic generation. In contrast when a forecast of weather pattern indicates poor photovoltaic generation, the long term hydrogen storage may be set for rapid storage and for high power output by using high power settings in both the electrolysis step as well as the fuel cell step.

Figure 2:
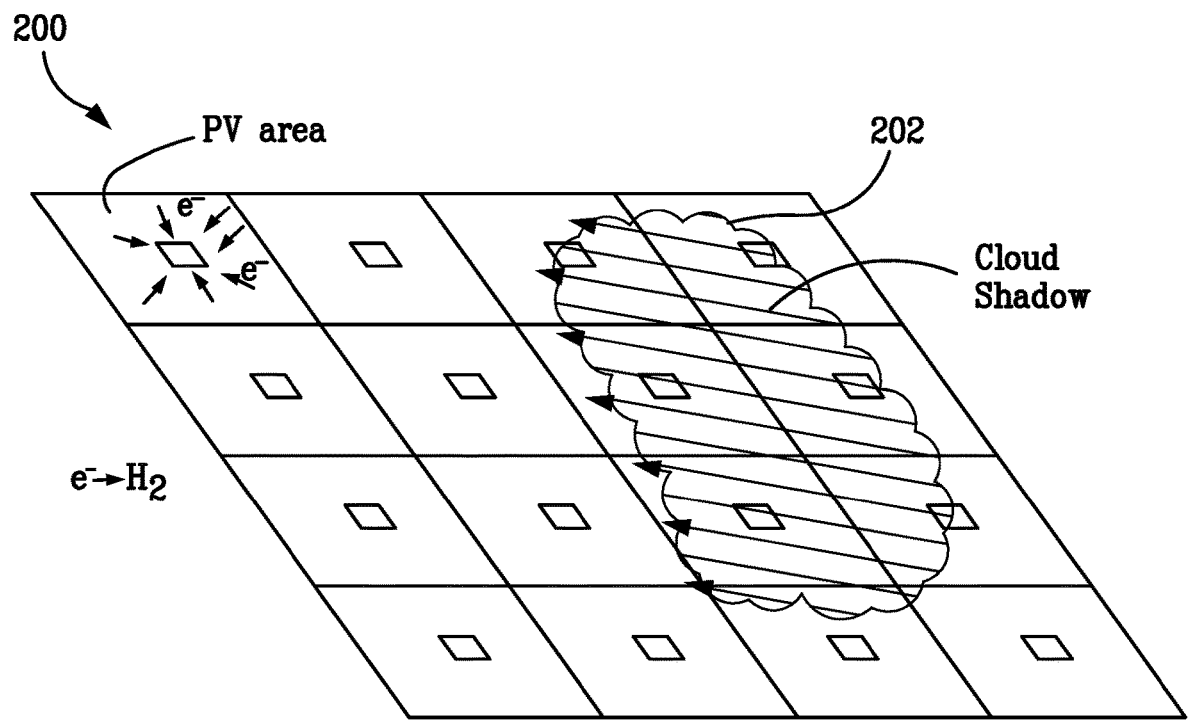
FIG. 2 illustrates a cloud transient over solar panels.

FIG. 2 illustrates a cloud transient over solar panels 200. As shown, the electricity generated by each panel may be used to charge hydrogen storage. A shadow 202 of a cloud may pass over the panels 200. In some aspects, the movement of the cloud or shadow 202 may be tracked and the plant may be controlled to mitigate the impact of the shadow. For example, as described herein, short term energy storage such as batteries may be used to stabilize the power output of the plant while the shadow 202 transitions across the panels 200. For instance, based on the movement of the shadow, the computing device (e.g., weather identification circuit 122) may forecast which panels will be impacted by the shadow at a particular time in the future, and prepare the distribution of power from short term energy storage to stabilize the power output from such panels.

Figure 3:
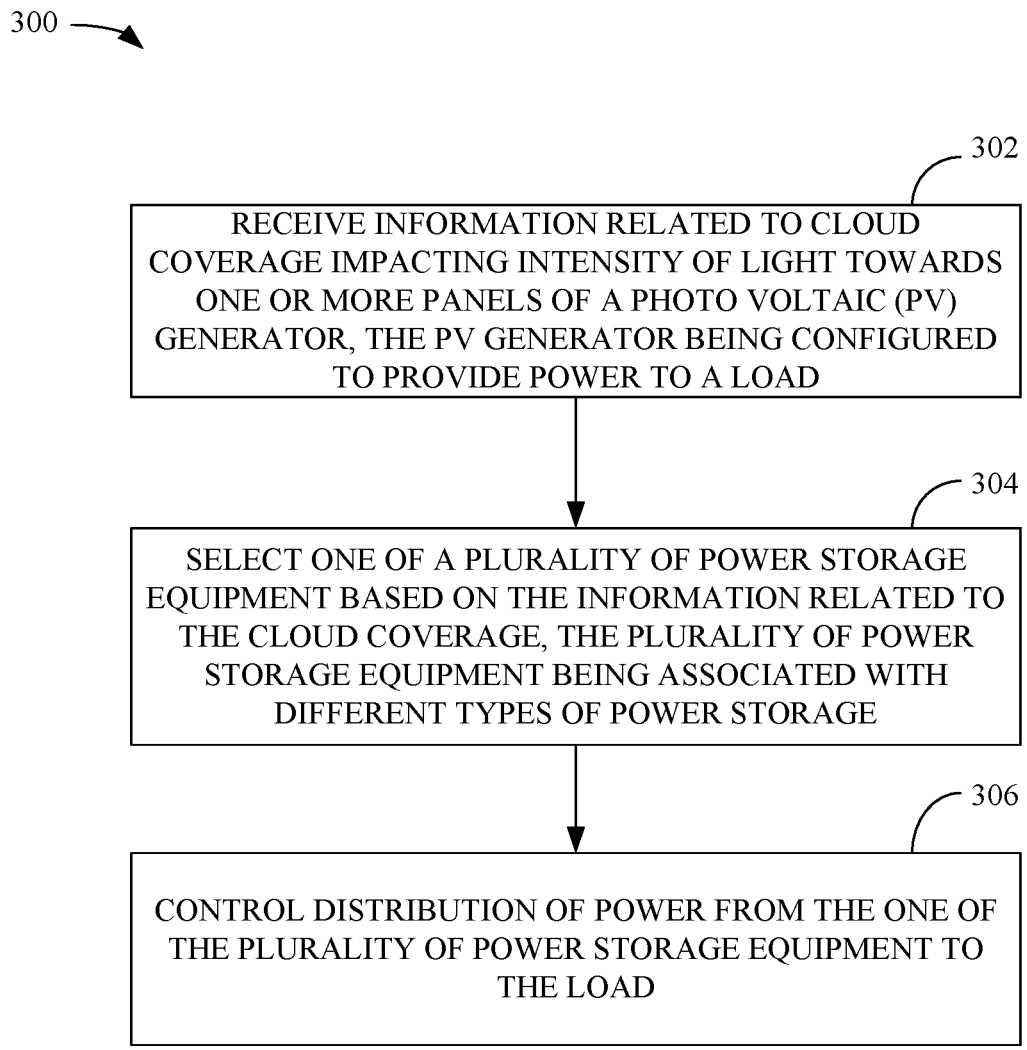
FIG. 3 is a flow diagram illustrating example operations for power generation, in accordance with certain aspects of the present disclosure.

FIG. 3 is a flow diagram illustrating example operations 300 for power generation, in accordance with certain aspects of the present disclosure. The operations 300 may be performed, for example, by a power generation system such as the power generation system 100.

At block 302, the power generation system may receive information related to cloud coverage impacting intensity of light towards one or more panels of a photovoltaic (PV) generator, the PV generator being configured to provide power to a load.

At block 304, the power generation system selects one of a plurality of power storage equipment based on the information related to the cloud coverage, the plurality of power storage equipment being associated with different types of power storage. The different types of power storage include long term energy storage (e.g., hydrogen storage) and short term energy storage (e.g., battery storage).

In some aspects, selecting one of the plurality of power storage equipment includes selecting short term storage equipment (also referred to herein as short term energy storage) based on a duration of impact to the intensity of the light by the cloud coverage being less than a threshold. Selecting one of the plurality of power storage equipment may include selecting long term storage equipment (e.g., also referred to herein as long term energy storage) based on a duration of impact to the intensity of the light by the cloud coverage being greater than a threshold. At block 306, the power generation system controls the distribution of power from the one of the plurality of power storage equipment to the load.

In some aspects, during periods when weather sensors included in the photovoltaic installation detect high lightning activity, the installation may be separated from the utility by opening utility connect circuit breakers or contacts. During these times, the output of the photovoltaic equipment (e.g., solar panels 200) may be directed to charging local energy storage systems such as battery storage and hydrogen storage. In some aspects, the lightning sensors (e.g., one or more sensors 180) may include sensors receiving network connected weather information and/or may be local area cameras facing clouds and detecting local area lightning emissions.

Figure 4:
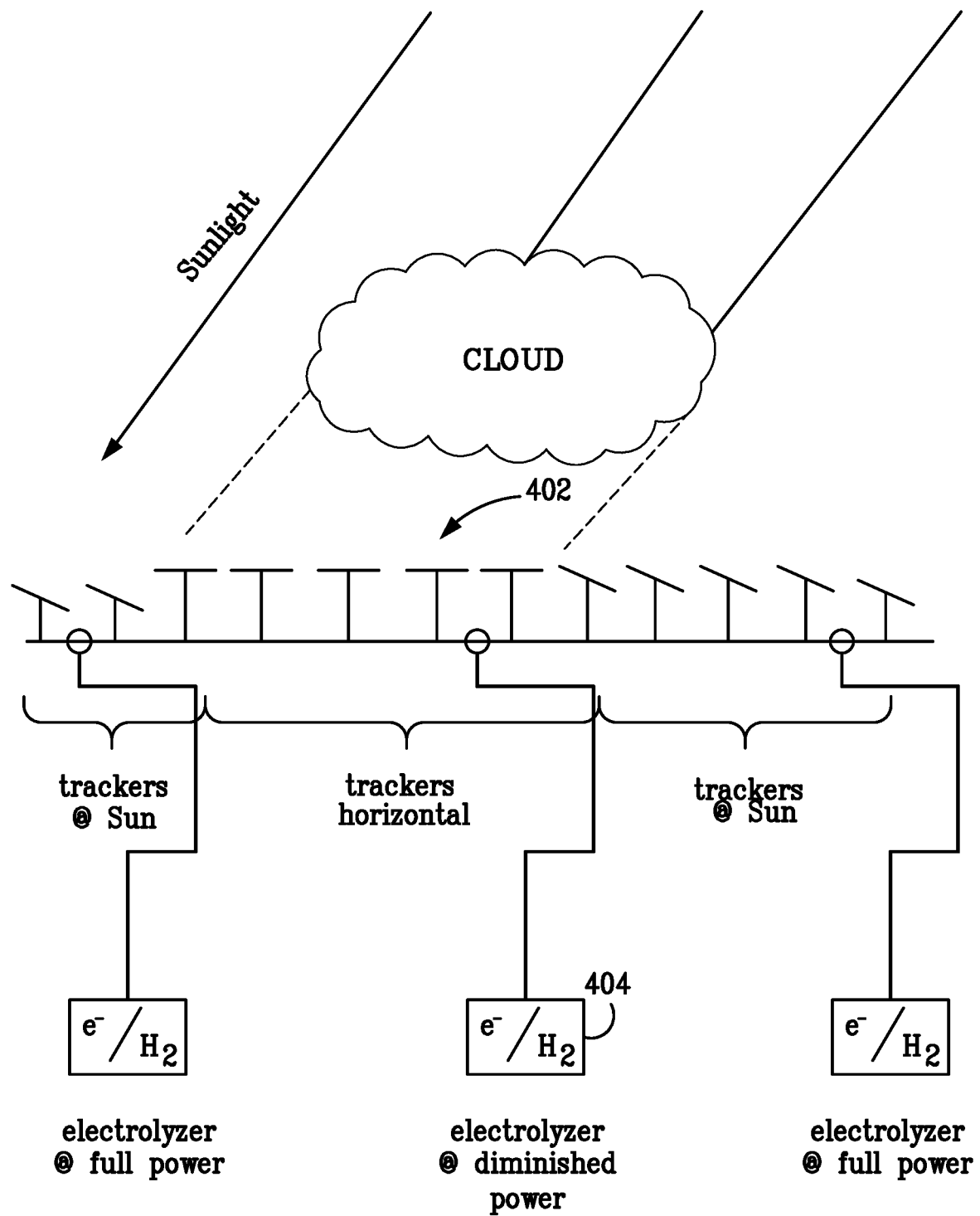
FIG. 4 illustrates control of trackers based on weather sensing, in accordance with certain aspects of the present disclosure.

FIG. 4 illustrates control of trackers based on weather sensing, in accordance with certain aspects of the present disclosure. The computing device 101 may provide weather data to control trackers via the tracker control circuit 126 shown in FIG. 1. At times of projected cloudiness, the trackers may be faced upwards (i.e., horizontal) because when clouds are thick, directing photovoltaic panels upward achieves more output than tilting panels toward the position of the sun. The one or more sensors 180 may include sensors for local sunlight detection or photo based cloud detection. By detecting sunlight or clouds, the sky may be imaged and the position of clouds may be tracked along with their shadows. If clouds are slow moving and thick, the tracker may have sufficient speed to rotate and respond to the movement of the cloud as the thick cloud shadow passes over the solar installation panels. Thus, the cloud shadow is tracked where impacted trackers 402 are rotated to a horizontal position to increase output, and subsequently returned to an angle facing the sun when the cloud has cleared, as shown in FIG. 3. As shown, when trackers are in horizontal positions, the associated electrolyzer (e.g., electrolyzer 404) may operate at diminished power. If clouds are fast moving and thin such that tracker speed is insufficient to respond to the movement of the cloud, the trackers may maintain an optimal sun facing orientation with small movements to optimize output.

If clouds are slow moving and have density variations, the trackers may orient the panels to be sun facing. Some clouds may be thick in some regions, and thin in other regions. In this case, panels impacted by a shadow from the thick region of the cloud may be oriented to a horizontal position, and panels impacted by a shadow from a thin region of the cloud may be oriented to an optimal sun facing orientation.

Figure 5:
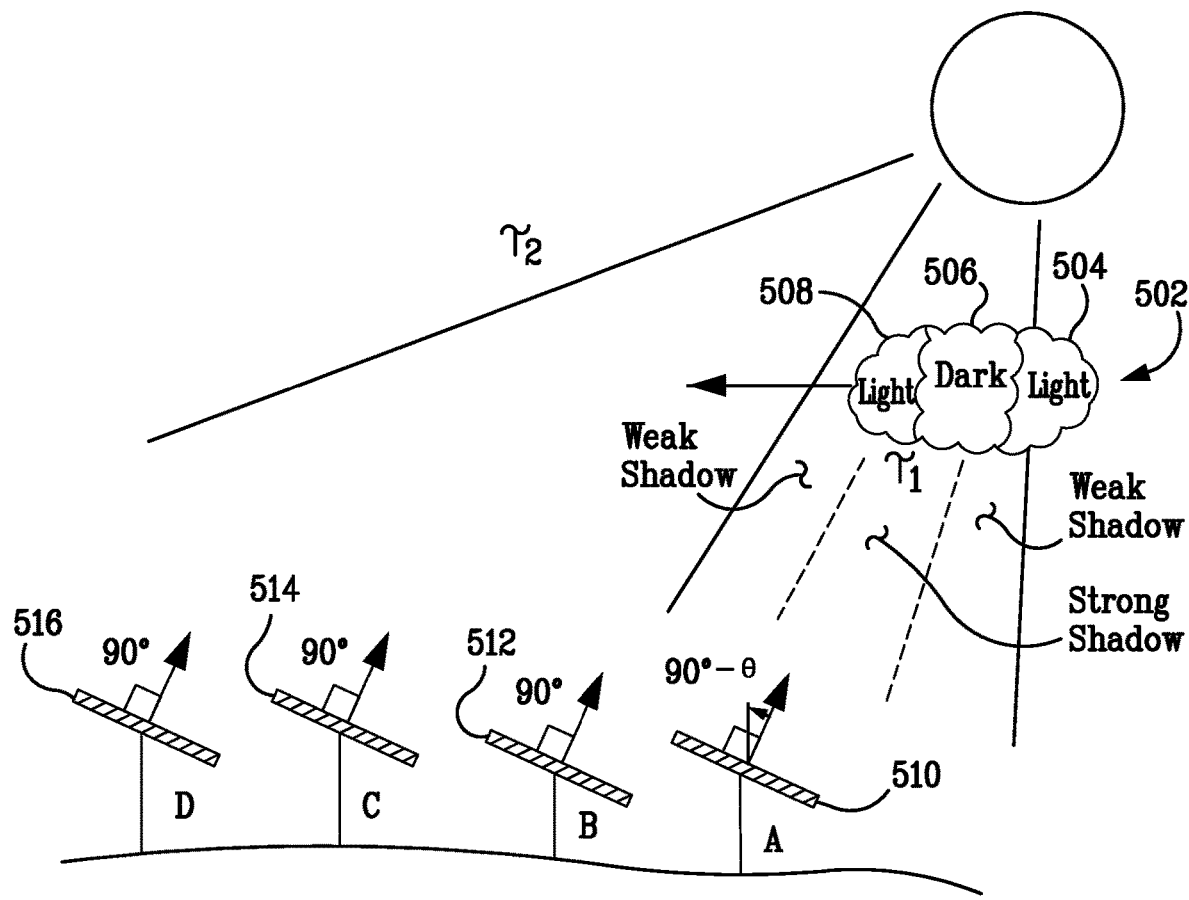
FIG. 5 illustrates control of trackers based on weather sensing, in accordance with certain aspects of the present disclosure.

FIG. 5 illustrates control of trackers based on weather sensing, in accordance with certain aspects of the present disclosure. As shown, the solar plant may include trackers 510, 512, 514, and 516. Sensors may detect the movement of a cloud 502. As shown, the cloud 502 may include portions of different densities. For example, the cloud 502 may include a light cloud portion 504, a dark cloud portion 506, and a light cloud portion 508. The trackers may change the orientation of panels depending on the shadow from each portion. The trackers may change the orientation of panels with respect to the direction the panels face (i.e., north, south, east, west) and/or to the angle of the panel with respect to the sun. For example, at time T0, trackers 510, 512, 514, and 516 may be at an angle set for improving power generation, such as at a 90° angle to the sun, as shown. At T1, tracker 510 may be within the shadow from the dark cloud portion 506. Thus, tracker 510 may tilt to an angle of 90°-θ, where θ is selected based on the intensity of cloud cover (e.g., to improve power generation given the cloud cover). The angle θ may be from 0° to 90°, 0° to 60°, 0° to 45°, 0° to 30°, or 0° to 15°. At time T2, the cloud propagates, and tracker 512 tilts to 90°-θ and tracker 510 tilts back to the 90° angle, and so on for each of the trackers.

Figure 6:
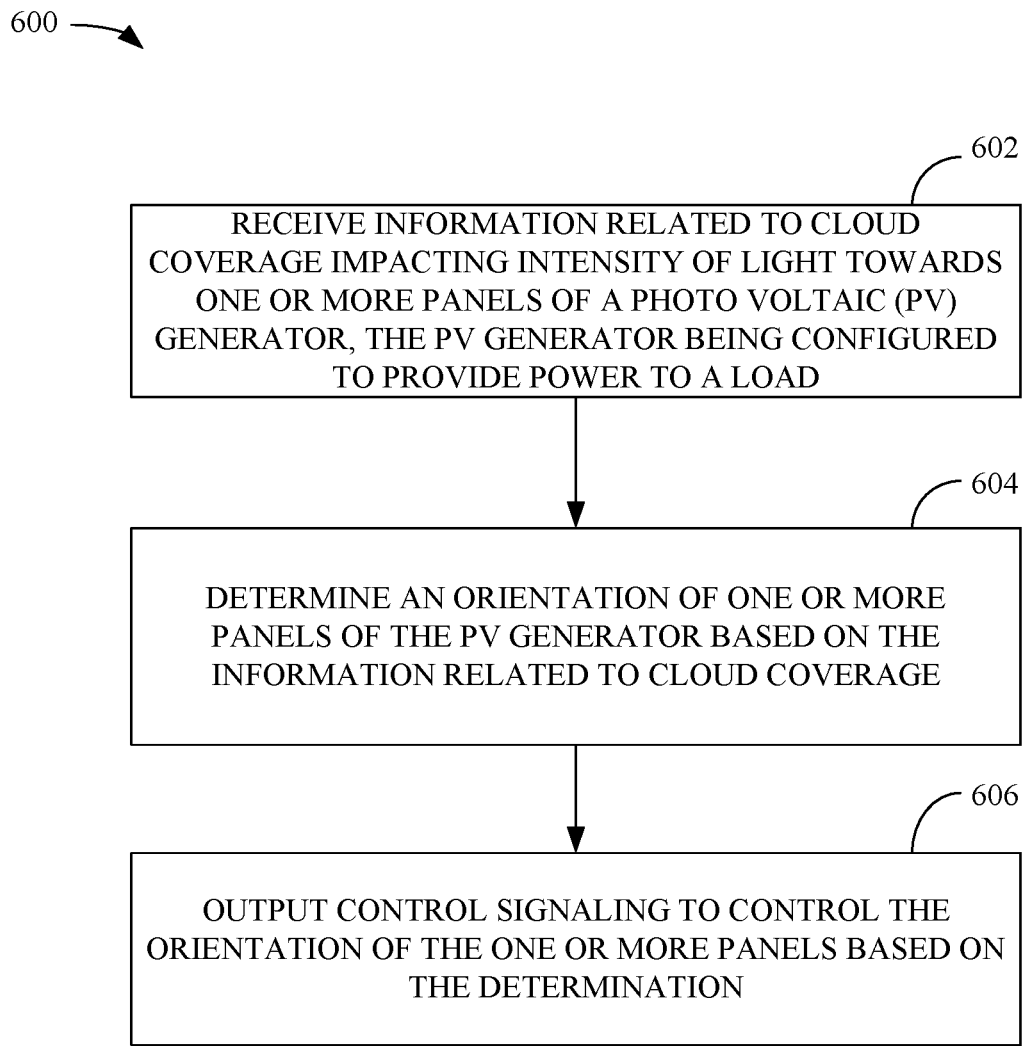
FIG. 6 is a flow diagram illustrating example operations for power generation, in accordance with certain aspects of the present disclosure.

FIG. 6 is a flow diagram illustrating example operations 600 for power generation, in accordance with certain aspects of the present disclosure. The operations 600 may be performed, for example, by a power generation system such as the power generation system 100.

At block 602, the power generation system may receive information related to cloud coverage impacting intensity of light towards one or more panels of a photovoltaic (PV) generator, the PV generator being configured to provide power to a load. At block 604, the power generation system may determine an orientation of one or more panels of the PV generator based on the information related to cloud coverage. In some aspects, determining the orientation of the one or more panels may include determining an angle associated with the one or more panels based on an intensity of light received through the cloud coverage.

At block 606, the power generation system may output control signaling to control the orientation of the one or more panels based on the determination. In some aspects, controlling the orientation includes setting a horizontal orientation for the one or more panels based on the cloud coverage causing a shadow on the one or more panels. In some aspects, the power generation system may determine whether to orient the one or more panels to face the sun based on a density of a cloud causing a shadow on the one or more panels, the orientation of the one or more panels being controlled based on the determination.

Figure 7:
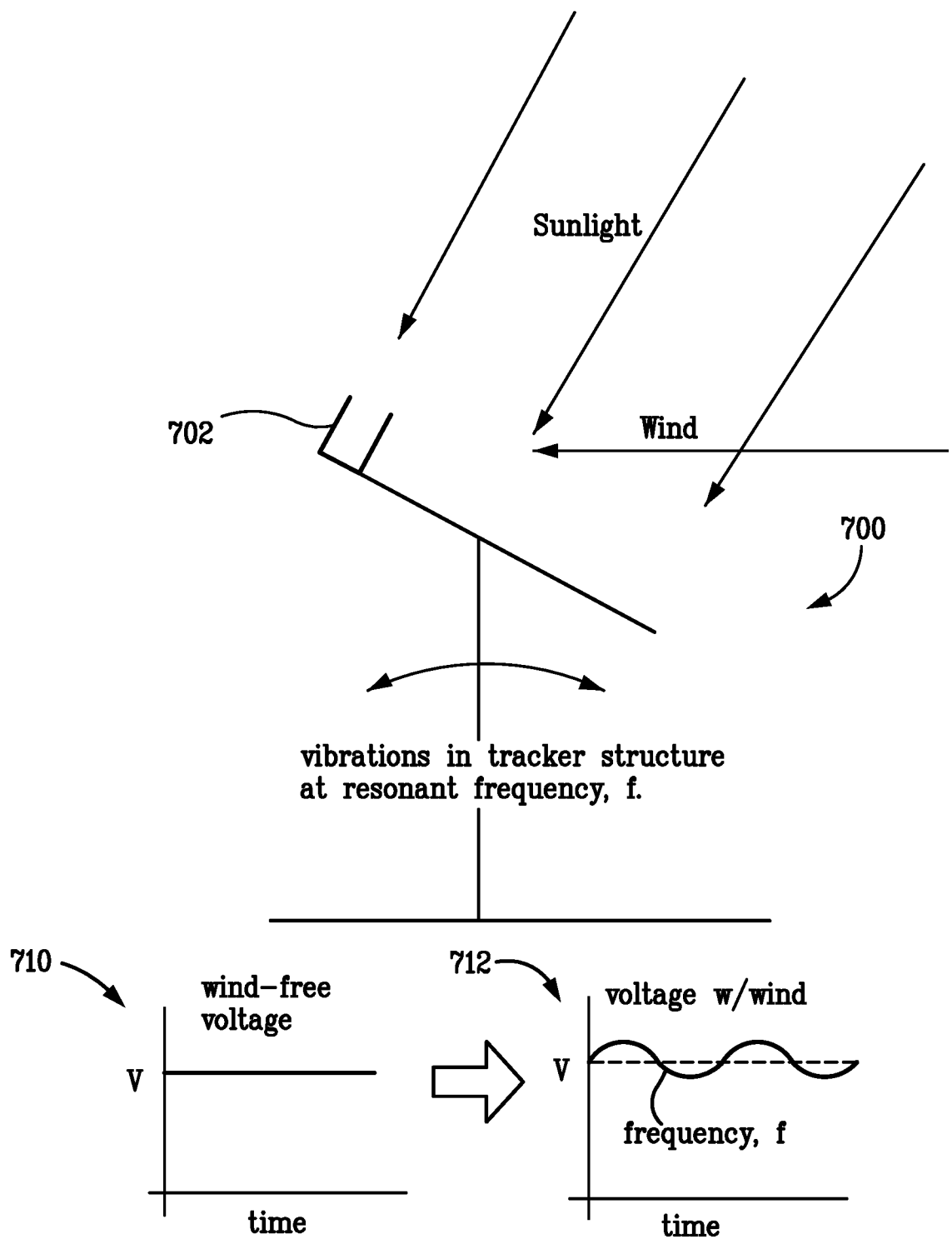
FIG. 7 illustrates a tracker controlled based on wind sensing, in accordance with certain aspects of the present disclosure.

FIG. 7 illustrates a tracker 700 controlled based on wind sensing, in accordance with certain aspects of the present disclosure. The power generation system 100 (e.g., via weather identification circuit 122 of computing device 101) may detect wind speed for controlling PV panels (e.g., without the need for expensive and low reliability wind sensing equipment). For example, wind speed may be detected by monitoring the PV panel output for voltage fluctuations at the frequency or frequencies of the mechanical structure (e.g., the resonant frequency of the structure) of the PV panels and tracking structure. When voltage fluctuations at certain frequencies increase, this can be noted as a condition of higher wind incidence on the panels resulting in mechanical vibrations.

At times of higher wind speeds, the tracker assembly may track the panels to a horizontal condition for increased reliability against high winds. For example, as shown by graph 710, without wind, the output voltage from the panels may be constant (e.g., direct current (DC)). However, as shown by graph 712, with wind, the voltage from the panels fluctuates at a frequency f. Frequency f may be the resonant frequency of the structure associated with tracker 700.

In some aspects, a fast Fourier transform (FFT) of the voltage from the panels may be used to detect the frequency indicative of increased winds. In response to increased winds as detected from the panel output voltage, the tracker may be controlled to orient the panels horizontally, reducing the structural impact of the wind.

In some aspects, by using lenses or collimators on reference PV cells, the vibration signal which results in the voltage from physical vibration of the photovoltaic panels may be increased, allowing for better signal to noise ratio. For instance, to increase the vibration response, a lens 702 may be used to focus light provided to a reference cell of the panel. The collimated reference cell provides an amplified voltage response to the light, allowing for the frequency indicative of the voltage to be more accurately and efficiently detected.

In some aspects, patterns of vibration may be monitored across the installation. Such patterns may be indicative of tracker mechanical failure and/or physical tampering with the tracker assembly. Upon detection of such failure or tampering, a notification may be sent to perform corrective action.

Figure 8:
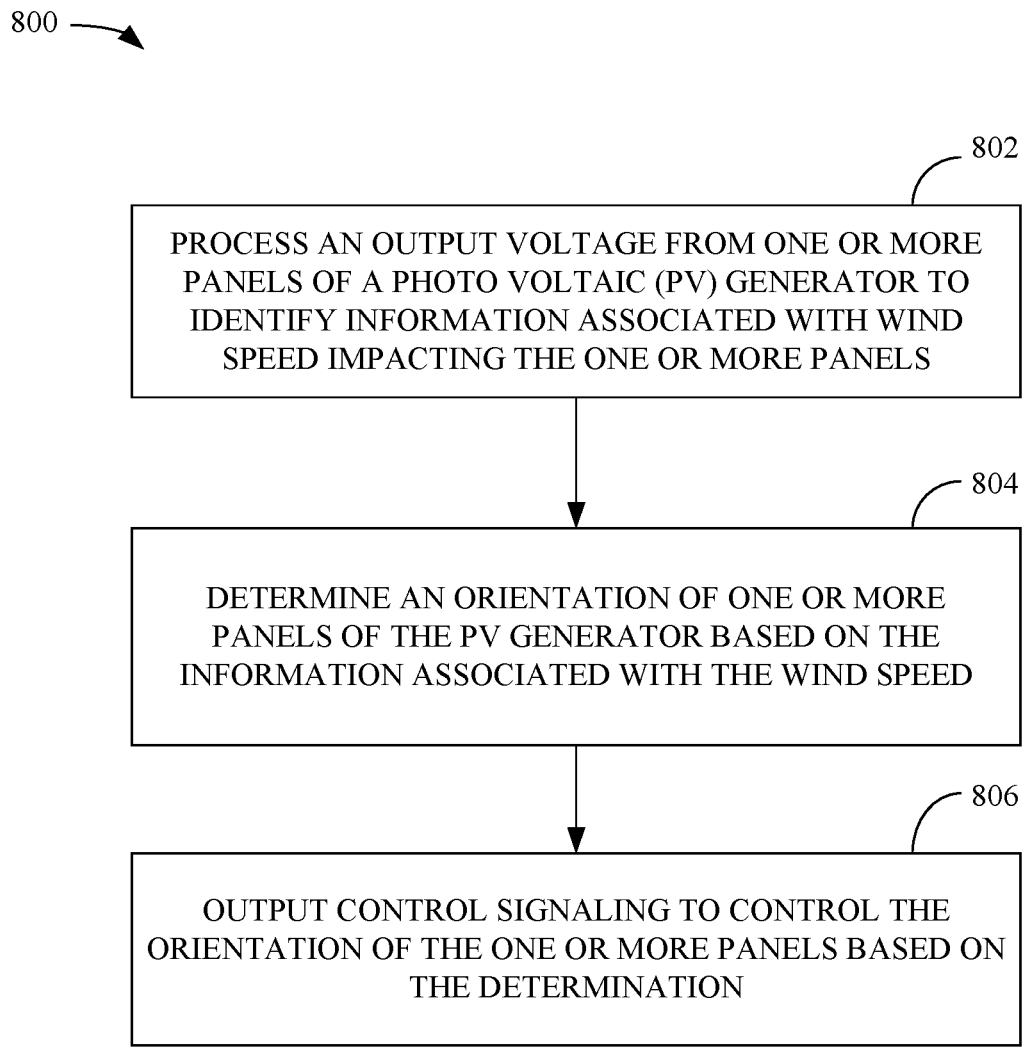
FIG. 8 illustrates example operations for power generation, in accordance with certain aspects of the present disclosure.

FIG. 8 illustrates example operations 800 for power generation, in accordance with certain aspects of the present disclosure. The operations 800 may be performed, for example, by a power generation system, such as the power generation system 100.

At block 802, the power generation system 100 may process an output voltage from one or more panels of a PV generator to identify information associated with wind speed impacting the one or more panels. Identifying the information associated with the wind speed may include identifying a frequency associated with the output voltage from the one or more panels indicative of panel vibrations.

At block 804, the power generation system 100 may determine an orientation of one or more panels of the PV generator based on the information associated with the wind speed. The orientation may include a horizontal orientation based on the wind speed being greater than a threshold.

At block 806, the power generation system may output control signaling to control the orientation of the one or more panels based on the determination. In some aspects, the power generation system may process the output voltage to identify tampering or a fault associated with the one or more panels. The power generation system may output a notification signal indicating the tampering or the fault.

Figure 9:
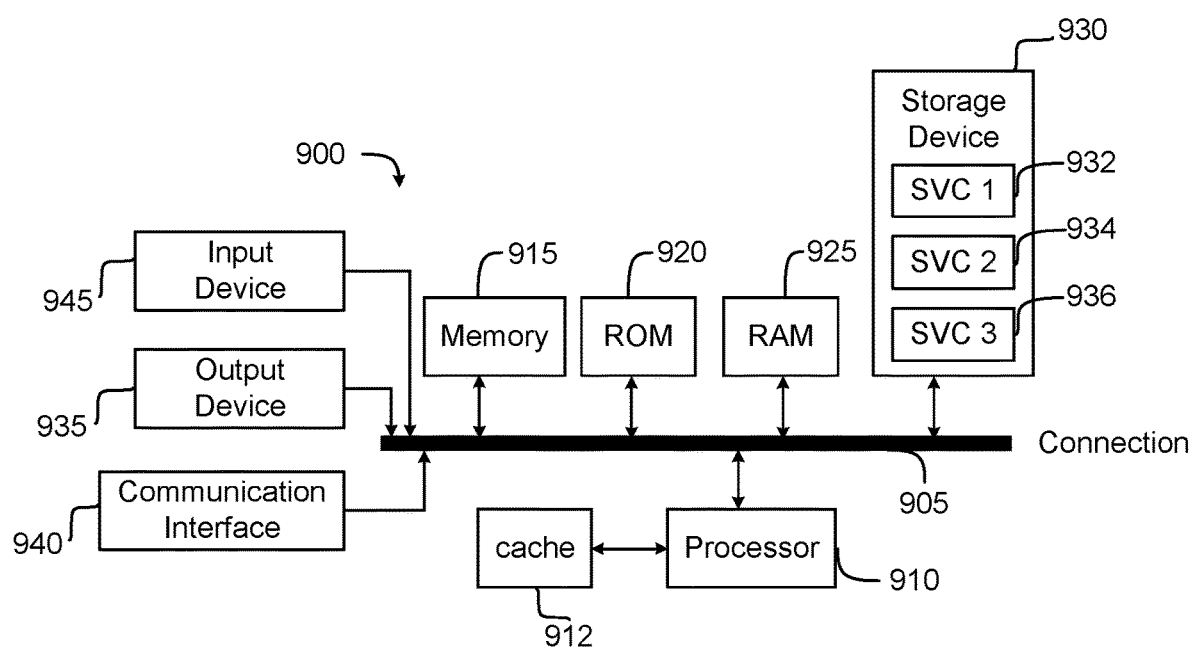
FIG. 9 illustrates an architecture of a computing system.

FIG. 9 illustrates an architecture of a computing system 900 wherein the components of the system 900 are in electrical communication with each other using a connection 905, such as a bus. Exemplary system 900 includes a processing unit (CPU or processor) 910 and a system connection 905 that couples various system components including the system memory 915, such as read only memory (ROM) 920 and random access memory (RAM) 925, to the processor 910. The system 900 can include a cache of high-speed memory connected directly with, in close proximity to, or integrated as part of the processor 910. The system 900 can copy data from the memory 915 and/or the storage device 930 to the cache 912 for quick access by the processor 910. In this way, the cache can provide a performance boost that avoids processor 910 delays while waiting for data. These and other modules can control or be configured to control the processor 910 to perform various actions. Other system memory 915 may be available for use as well. The memory 915 can include multiple different types of memory with different performance characteristics. The processor 910 can include any general purpose processor and a hardware or software service, such as service 1 932, service 2 934, and service 3 936 stored in storage device 930, configured to control the processor 910 as well as a special-purpose processor where software instructions are incorporated into the actual processor design. The processor 910 may be a completely self-contained computing system, containing multiple cores or processors, a bus, memory controller, cache, etc. A multi-core processor may be symmetric or asymmetric.

To enable client interaction with the computing system 900, an input device 945 can represent any number of input mechanisms, such as a microphone for speech, a touch-sensitive screen for gesture or graphical input, keyboard, mouse, motion input, speech and so forth. An output device 935 can also be one or more of a number of output mechanisms known to those of skill in the art. In some instances, multimodal systems can enable a client to provide multiple types of input to communicate with the computing system 900. The communications interface 940 can generally govern and manage the client input and system output. There is no restriction on operating on any particular hardware arrangement and therefore the basic features here may easily be substituted for improved hardware or firmware arrangements as they are developed.

Storage device 930 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 925, read only memory (ROM) 920, and hybrids thereof The storage device 930 can include services 932, 934, 936 for controlling the processor 910. Other hardware or software modules are contemplated. The storage device 930 can be connected to the system connection 905. In one aspect, a hardware module that performs a particular function can include the software component stored in a computer-readable medium in connection with the necessary hardware components, such as the processor 910, connection 905, output device 935, and so forth, to carry out the function.

Certain aspects and embodiments of this disclosure are provided herein. Some of these aspects and embodiments may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides example embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the application as set forth in the appended claims.

As used herein, the term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the embodiments and examples provided herein. However, it will be understood by one of ordinary skill in the art that the embodiments may be practiced without these specific details. For clarity of explanation, in some instances the present technology may be presented as including individual functional blocks including functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Individual embodiments may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific embodiments thereof, but those skilled in the art will recognize that the application is not limited thereto. Thus, while illustrative embodiments of the application have been described in detail herein, it is to be understood that the concepts in this disclosure may be otherwise variously embodied and employed, and that the appended claims are intended to be construed to include such variations, except as limited by the prior art. Various features and aspects of the above-described application may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" or "one or more of" a set indicates that one member of the set or multiple members of the set satisfy the claim. For example, claim language reciting "at least one of A and B" means A, B, or A and B.

The various illustrative logical blocks, modules, circuits, and algorithm steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules.

EXAMPLE ASPECTS

Clause 1. A method for power generation, comprising: receiving information related to cloud coverage impacting intensity of light towards one or more panels of a photovoltaic (PV) generator, the PV generator being configured to provide power to a load; selecting one of a plurality of power storage equipment based on the information related to the cloud coverage, the plurality of power storage equipment being associated with different types of power storage; and controlling distribution of power from the one of the plurality of power storage equipment to the load.

Clause 2. The method of clause 1, wherein the different types of power storage include long term energy storage and short term energy storage.

Clause 3. The method of clause 2, wherein the different types of power storage includes battery storage as the short term energy storage and hydrogen storage as the long term energy storage.

Clause 4. The method of any one of clauses 1-3, wherein selecting one of the plurality of power storage equipment includes selecting short term storage equipment based on a duration of impact to the intensity of the light by the cloud coverage being less than a threshold.

Clause 5. The method of any one of clauses 1-4, wherein selecting one of the plurality of power storage equipment includes selecting long term storage equipment based on a duration of impact to the intensity of the light by the cloud coverage being greater than a threshold.

Clause 6. The method of any one of clauses 1-5, further comprising: controlling an orientation of the one or more panels of the PV generator based on the information related to cloud coverage.

Clause 7. The method of clause 6, wherein controlling the orientation includes setting a horizontal orientation for the one or more panels based on the cloud coverage causing a shadow on the one or more panels.

Clause 8. The method of any one of clauses 6-7, further comprising determining whether to orient the one or more panels to a sun facing direction based on a density of a cloud causing a shadow on the one or more panels, the orientation of the one or more panels being controlled based on the determination.

Clause 9. The method of any one of clauses 6-8, further comprising determining an angle associated with the one or more panels based on an intensity of light received through the cloud coverage, the orientation of the one or more panels being controlled based on the angle.

Clause 10. The method of any one of clauses 1-9, further comprising: identifying information associated with wind speed impacting the one or more panels; and controlling an orientation of the one or more panels of the PV generator based on the information associated with the wind speed.

Clause 11. The method of clause 10, wherein identifying the information associated with the wind speed includes identifying a frequency associated with an output voltage from the one or more panels indicating of panel vibrations.

Clause 12. The method of clause 11, wherein a cell of the one or more panels includes a lens to increase vibration response to the wind speed.

Clause 13. A method for power generation, comprising: receiving information related to cloud coverage impacting intensity of light towards one or more panels of a photovoltaic (PV) generator, the PV generator being configured to provide power to a load; determining an orientation of one or more panels of the PV generator based on the information related to cloud coverage; and outputting control signaling to control the orientation of the one or more panels based on the determination.

Clause 14. The method of clause 13, wherein controlling the orientation includes setting a horizontal orientation for the one or more panels based on the cloud coverage causing a shadow on the one or more panels.

Clause 15. The method of any one of clauses 13-14, further comprising determining whether to orient the one or more panels to a sun facing direction based on a density of a cloud causing a shadow on the one or more panels, the orientation of the one or more panels being controlled based on the determination.

Clause 16. The method of any one of clauses 13-15, wherein determining the orientation of the one or more panels includes determining an angle associated with the one or more panels based on an intensity of light received through the cloud coverage.

Clause 17. A method for power generation, comprising: processing an output voltage from one or more panels of a photovoltaic (PV) generator to identify information associated with wind speed impacting the one or more panels; determining an orientation of one or more panels of the PV generator based on the information associated with the wind speed; and outputting control signaling to control the orientation of the one or more panels based on the determination.

Clause 18. The method of clause 17, wherein identifying the information associated with the wind speed includes identifying a frequency associated with the output voltage from the one or more panels indicative of panel vibrations.

Clause 19. The method of any one of clauses 17-18, wherein the orientation includes a horizontal orientation based on the wind speed being greater than a threshold.

Clause 20. The method of any one of clauses 17-19, further comprising: processing the output voltage to identify tampering or a fault associated with the one or more panels; and outputting a notification signal indicating the tampering or the fault.

What is claimed is:

1. A method for power generation, comprising:
receiving information related to cloud coverage impacting intensity of light towards one or more panels of a photovoltaic (PV) generator, the PV generator being configured to provide power to a load;
selecting one of a plurality of power storage equipment based on the information related to the cloud coverage, the plurality of power storage equipment being associated with different types of power storage;
controlling distribution of power from the one of the plurality of power storage equipment to the load; and
identifying information associated with wind speed presently impacting the one or more panels by identifying a frequency associated with an output voltage from the one or more panels indicating panel vibrations.

2. The method of claim 1, wherein the different types of power storage include long term energy storage and short term energy storage.

3. The method of claim 2, wherein the different types of power storage includes battery storage as the short term energy storage and hydrogen storage as the long term energy storage.

4. The method of claim 1, wherein selecting one of the plurality of power storage equipment includes selecting short term storage equipment based on a duration of impact to the intensity of the light by the cloud coverage being less than a threshold.

5. The method of claim 1, wherein selecting one of the plurality of power storage equipment includes selecting long term storage equipment based on a duration of impact to the intensity of the light by the cloud coverage being greater than a threshold.

6. The method of claim 1, further comprising:
controlling an orientation of the one or more panels of the PV generator based on the information related to cloud coverage.

7. The method of claim 6, wherein controlling the orientation includes setting a horizontal orientation for the one or more panels based on the cloud coverage causing a shadow on the one or more panels.

8. The method of claim 6, further comprising determining whether to orient the one or more panels to a sun facing direction based on a density of a cloud causing a shadow on the one or more panels, the orientation of the one or more panels being controlled based on the determination.

9. The method of claim 6, further comprising determining an angle associated with the one or more panels based on an intensity of light received through the cloud coverage, the orientation of the one or more panels being controlled based on the angle.

10. The method of claim 1, further comprising:
controlling an orientation of the one or more panels of the PV generator based on the information associated with the wind speed.

11. The method of claim 1, wherein a cell of the one or more panels includes a lens to increase vibration response to the wind speed.

12. A method for power generation, comprising:
receiving information related to cloud coverage impacting intensity of light towards one or more panels of a photovoltaic (PV) generator, the PV generator being configured to provide power to a load;
identifying information associated with wind speed presently impacting the one or more panels by identifying a frequency associated with an output voltage from the one or more panels indicating panel vibrations;
determining an orientation of one or more panels of the PV generator based on at least one of the information related to cloud coverage or the information associated with the wind speed; and
outputting control signaling to control the orientation of the one or more panels based on the determination.

13. The method of claim 12, wherein controlling the orientation includes setting a horizontal orientation for the one or more panels based on the cloud coverage causing a shadow on the one or more panels.

14. The method of claim 12, further comprising determining whether to orient the one or more panels to a sun facing direction based on a density of a cloud causing a shadow on the one or more panels, the orientation of the one or more panels being controlled based on the determination.

15. The method of claim 12, wherein determining the orientation of the one or more panels includes determining an angle associated with the one or more panels based on an intensity of light received through the cloud coverage.

16. A method for power generation, comprising:
processing an output voltage from one or more panels of a photovoltaic (PV) generator to identify information associated with wind speed presently impacting the one or more panels by identifying a frequency associated with the output voltage from the one or more panels indicative of panel vibrations;
determining an orientation of one or more panels of the PV generator based on the information associated with the wind speed; and
outputting control signaling to control the orientation of the one or more panels based on the determination.

17. The method of claim 16, wherein the orientation includes a horizontal orientation based on the wind speed being greater than a threshold.

18. The method of claim 16, further comprising:
processing the output voltage to identify tampering or a fault associated with the one or more panels; and
outputting a notification signal indicating the tampering or the fault.

* * * * *